US 6,682,819 B2

United States Patent
Damo

(10) Patent No.: US 6,682,819 B2
(45) Date of Patent: Jan. 27, 2004

(54) DEVICE TO PRODUCE POLYURETHANE ARTICLES, RELATIVE METHOD AND POLYURETHANE ARTICLES THUS OBTAINED

(75) Inventor: Mario Damo, Oderzo (IT)

(73) Assignee: G.M.P. Poliuretani SpA, Oderzo (TV) (IT)

(*) Notice: Subject to any disclaimer, the term of this patent is extended or adjusted under 35 U.S.C. 154(b) by 76 days.

(21) Appl. No.: 10/129,139

(22) PCT Filed: Aug. 31, 2001

(86) PCT No.: PCT/IB01/01582

§ 371 (c)(1),
(2), (4) Date: May 2, 2002

(87) PCT Pub. No.: WO02/20239

PCT Pub. Date: Mar. 14, 2002

(65) Prior Publication Data

US 2002/0163100 A1 Nov. 7, 2002

(30) Foreign Application Priority Data

Sep. 5, 2000 (IT) .................................... UD2000A0163

(51) Int. Cl.⁷ .......................... B32B 27/40; B29C 45/14
(52) U.S. Cl. .............. 428/423.1; 264/255; 264/318; 264/334; 264/511; 264/553; 425/112; 425/125; 425/126.1; 425/127; 428/313.5
(58) Field of Search .................. 264/255, 318, 264/334, 551, 553; 425/112, 125, 126.1, 127; 428/423.1, 313.5

(56) References Cited

FOREIGN PATENT DOCUMENTS

| DE | 40 33 297 A1 | 5/1991 |
| DE | 198 54 663 A1 | 6/2000 |
| EP | 0 584 042 A1 | 2/1994 |
| WO | WO 91/17035 | 11/1991 |
| WO | WO 95/27604 | 10/1995 |
| WO | WO 96/03267 | 2/1996 |
| WO | WO 00/12282 | 3/2000 |

OTHER PUBLICATIONS

Kimura, E. "Molding Method of Synthetic Resin Molded Part With Skin Material", Patent Abstract of Japan of JP 60097816, (May 31, 1985).

Primary Examiner—D. S. Nakarani
(74) Attorney, Agent, or Firm—Finnegan, Henderson, Farabow, Garrett & Dunner, LLP

(57) ABSTRACT

Device to produce polyurethane articles (37) covered by a film (19), including a mold (30) comprising a female part (13) and a male part (12) defining a molding cavity (18) inside which polyurethane material (24) is able to be injected. The device also comprises, in association with the perimeter edge of said female part (13), means able to exert a connection function in substantial cooperation with the zone of discontinuity between said female part (13) and said male part (12). The means comprise a movable annular ring-nut (22) including a first position (22a) to load a segment of said film (19) in order to insert said segment inside the mold, and a second position (22b) at least partly overlapping on the perimeter of said female part (13) in order to cooperate with said female part (13) during the molding of said polyurethane material (24).

33 Claims, 7 Drawing Sheets

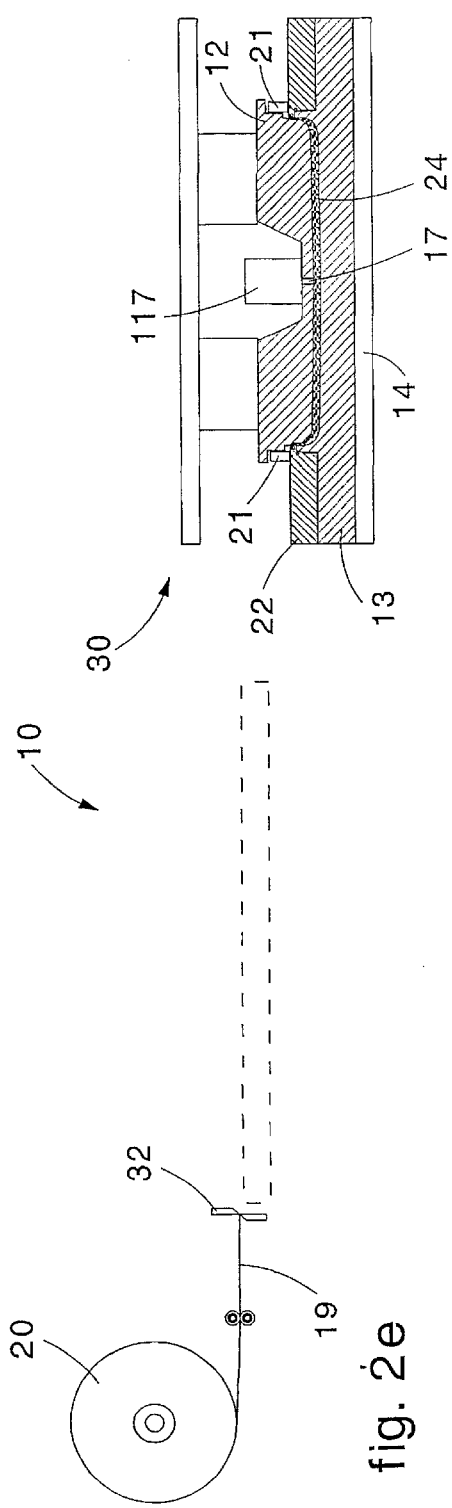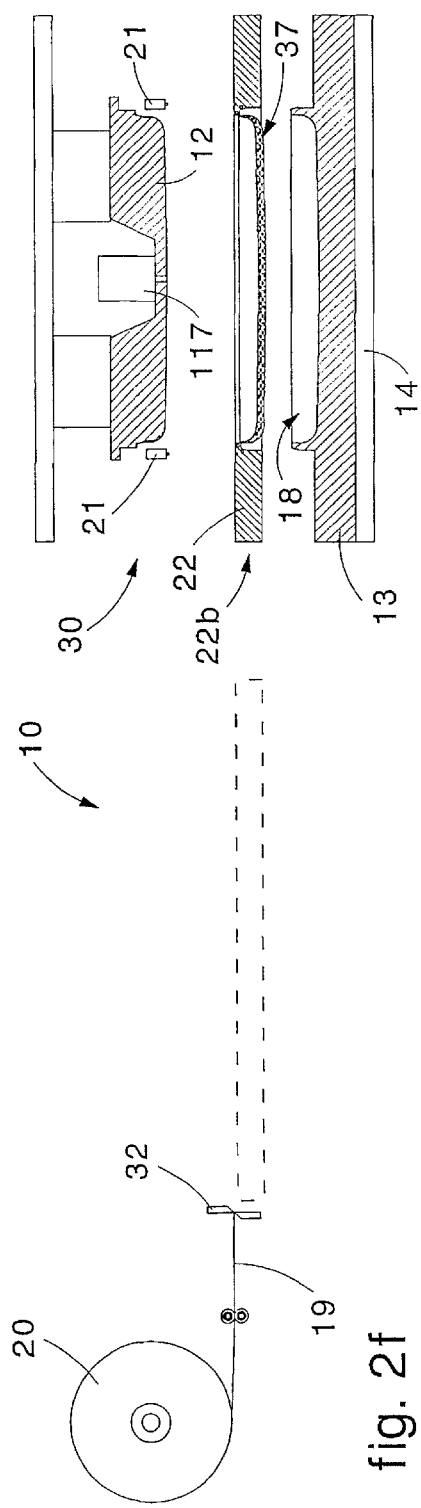

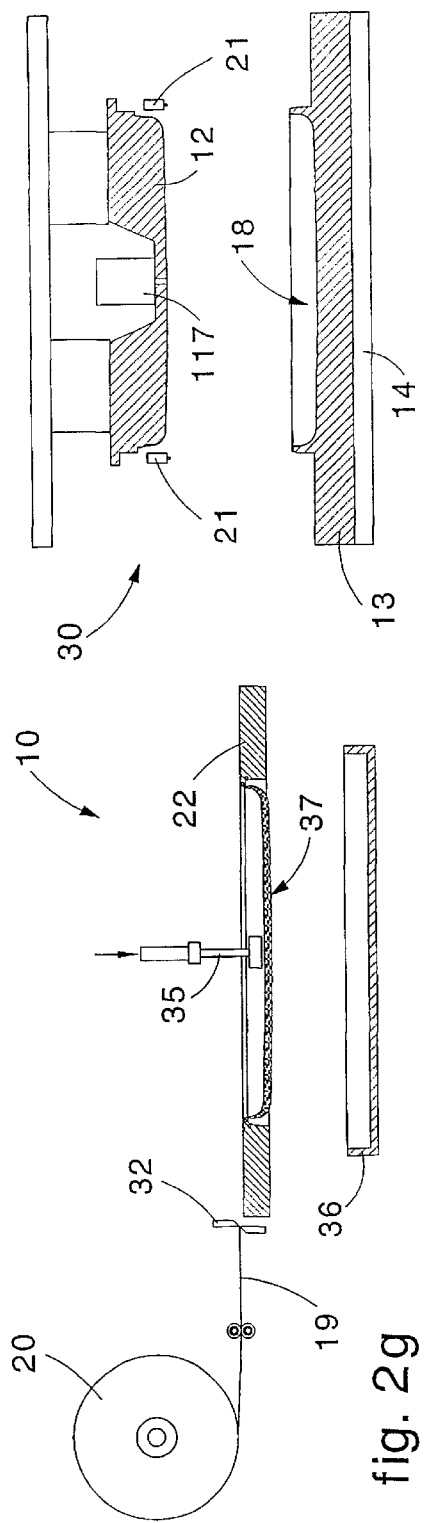
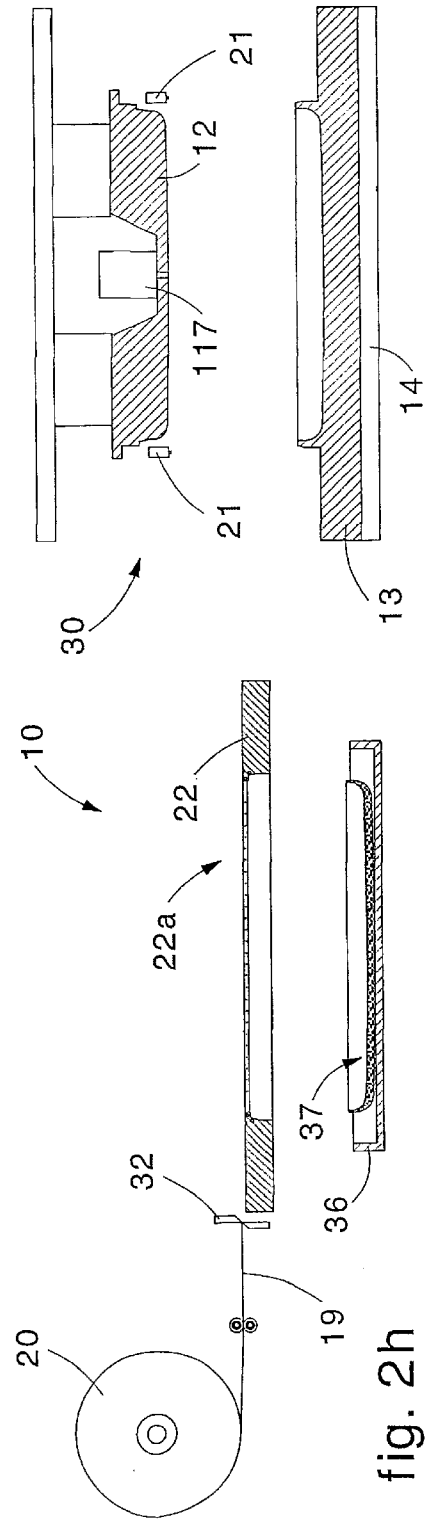

DEVICE TO PRODUCE POLYURETHANE ARTICLES, RELATIVE METHOD AND POLYURETHANE ARTICLES THUS OBTAINED

FIELD OF THE INVENTION

The invention concerns a device to make polyurethane articles, covered with a decorative film, which consists of a molding apparatus equipped with means able to perform the function of a perimeter undercut of the article.

The invention also concerns a method to produce polyurethane articles, wherein the steps of thermoforming the covering film and injecting/molding the polyurethane material are carried out in a single piece of apparatus and substantially in a single step, allowing to eliminate the subsequent, laborious operations of filling, sanding and painting in order to obtain the finished product.

The invention also allows to accelerate and automate both the steps of loading the film into the mold and also those of moving and discharging the covered polyurethane articles at the end of the forming/molding process.

The invention also concerns the polyurethane articles, covered with a decorative film, obtained with this method and this device. The invention is applied in the field of molding polyurethane articles, such as small articles of furniture, furniture wings, panels for automatic distributing machines or domestic appliances, containers, etc.

The invention reduces to a minimum the number of working stages needed to complete the production process, reducing the relative times and spaces, and allows to obtain finished products of high quality and surface finish, with substantially any desired shape.

BACKGROUND OF THE INVENTION

There are various methods, in the state of the art, to produce polyurethane articles, which are finding more and more varied applications in many fields of use.

Such articles are obtained, at present, essentially by means of two production processes.

A first process provides to paint the surface of the article after it has been removed from the mold. This process requires complex operations on the article which has been removed from the mold, such as trimming, filling, sanding and painting. These operations are not only very laborious, but also they do not give satisfactory results which can be repeated with acceptable levels of standardisation. Moreover, they require considerable manpower and long production times.

Furthermore, these operations considerably limit the possibility of automating the production process.

A second process provides to apply a covering, protective film at least on the visible face of the polyurethane article.

In this case, the state of the art provides to thermoform a covering film in a first mold, to insert it into another mold, and then to inject the polyurethane inside this second mold. By means of this film, the polyurethane articles are ensured the necessary surface resistance and the desired aesthetic quality.

However, this technique, using pre-formed films, also has some disadvantages, including the surface quality of the product, which is never regular due to the plays in elasticity of the products which are heated at different times, and to the adaptation of the thermoformed film to the mold because of the injection of the polyurethane. A further problem is the absence of a constant quality.

Moreover, this technique requires large work surfaces, both to move the material and also to perform the various steps described above.

The present Applicant, in the patent application PCT/IB00/01084, proposed an innovative method to produce covered polyurethane articles, by means of thermoforming the covering film in a mold and injecting polyurethane material into the same mold, wherein most of the disadvantages listed above are eliminated.

The articles obtained with the method described above emerge from the mold substantially finished, and only require the perimeter trimming of the film.

Document WO 00/12282 describes a method to mold objects made of plastic material wherein a covering sheet is made to adhere, by means of jets of compressed air, against the wall of the upper part of the mold, and then the plastic material is injected from below in order to form the covered article.

Document WO 96/03267 describes a method to produce covered thermoplastic articles wherein a covering film is arranged inside the cavity of the mold, and then the thermoplastic material is injected to thrust the film against the wall of the mold. This method provides that the edges of the film can be released during the injection process to allow the film to move into contact with the wall of the mold while the injected material fills the cavity thereof.

Document DE-A-4033297 shows a method to produce covered thermoplastic articles substantially identical to the previous ones.

In these prior art documents a first problem concerns the correct finishing of the visible surface of the covered polyurethane article, which must not have any visible signs or marks deriving from the forming and injection process.

Another problem concerns the possibility of moving and discharging, in an easy and rapid fashion, the finished covered article at the end of the molding process.

A further problem concerns the possibility of achieving covered polyurethane articles with particular shapes and contours, for example with undercuts which may be different from each other on each occasion.

The Applicant has devised and embodied this invention to solve these and other problems, and to obtain further advantages as will be shown hereafter.

SUMMARY OF THE INVENTION

The invention is set forth and characterized in the respective main claims, while the dependent claims describe other characteristics of the main embodiment.

The purpose of the invention is to achieve a method and a device suitable to supply, in a single molding step and with a single apparatus, a substantially finished polyurethane article characterized by high surface quality, even when there are perimeter undercuts present.

Another purpose is to achieve a molding device equipped with means able to cooperate with the perimeter edge of the article when the mold is closed, such means allowing to form a perimeter undercut and preventing the creation of an imperfect and/or damaged edge in correspondence with the discontinuity created between the coupled surfaces of the male and female parts of said mold.

A further purpose is to achieve a production method wherein the steps can be largely automated and allow the automatic loading of the film in correspondence with the mold, and also the molding, removal and discharge of substantially finished articles, which require only a perimeter trimming of the covering film present.

Another purpose of the invention is to achieve a device wherein the shape, and in particular the perimeter edge, of the article can be changed quickly, without requiring complex operations to dis-assemble and re-assemble parts, or the particular use of the labor force.

The molding device according to the invention comprises a molding apparatus consisting, in a substantially conventional fashion, of a female part, or matrix, suitable for the conformation of the visible face of the article, and a male part, or punch, suitable for the conformation of the non-visible face.

The male part is associated with press means able to move it from an open position to a closed position and incorporates the means to inject the polyurethane material when the mold is closed. The male and female parts of the mold have heating means which can be activated on command, for example, but not only, consisting of heated water circulating in the inner volume of the two elements, or of electric resistances, radiating elements, hot air, or other means.

In one embodiment of the invention, the heating means of the male and female part of the mold are autonomous and independent with respect to each other.

According to one characteristic of the invention, in association with the perimeter edge of the female part of the mold there are means able to perform a function of continuity and connection in correspondence with the zone of discontinuity between the male and female parts of the mold.

Said means are removable and replaceable and comprise, in a preferential embodiment, an annular ring-nut or frame which extends outside, and partly overlapping, the perimeter of the female part, so as to constitute substantially an auxiliary element, or counter-matrix, of the female part.

The annular ring-nut has at least one perimeter edge protruding forwards, in the direction of the molding cavity, which is shaped so as to cooperate with said discontinuity between the two parts of the mold, so that it is possible to form a perimeter undercut.

In this way the annular ring-nut allows to form a perimeter edge of the article without imperfections or irregularities, so that the only operative step required after the article has been removed from the mold is the perimeter trimming of the possible excess film.

According to another characteristic of the invention, the annular ring-nut is associated with movement means which allow it to make at least the following displacements:

- to be positioned in a position outside the molding apparatus in order to lay, cut and clamp, on part of its perimeter, a segment of the covering film,
- to be translated towards the molding apparatus in order to insert the film into the mold,
- to be lowered into substantial co-operation with the perimeter edge of the female part of the mold,
- to be raised with respect to the female part, once the forming and molding step is completed, taking the molded article with it, and finally
- to be translated laterally with respect to the molding apparatus, in order to allow the article to be removed and discharged, exploiting the excess parts of the film protruding from the figure of the article.

In order to perform the operation of loading the film into the mold, the annular ring-nut includes first vacuum means able to retain the film at least temporarily against the upper surface of the ring-nut.

In one embodiment of the invention, the annular ring-nut also has second vacuum means able to locally create a vacuum in order to achieve the thermoforming of the covering film, said means including external suction holes and slits outside the figure of the molded article.

In a further embodiment, the annular ring-nut has heating means, which can be selectively activated during the forming step of the film.

The heating means, according to a variant of the invention, are autonomous and independent with respect to the heating means of the components of the mold, so as to allow a selectively differentiated heating according to specific requirements.

In a preferential embodiment of the invention, the molding apparatus comprises pressure means, adjustable in pressure, suitable to cooperate with the surface of said annular ring-nut so as to define a sealing outer perimeter which retains the film mechanically during its thermoforming step.

According to a variant, said pressure means and said annular ring-nut have respective means, mating and cooperating, which prevent the formation of wrinkles and creases in the film during the thermoforming step and the subsequent injection of the polyurethane.

In another variant, in the case when the molding apparatus is of the type suitable for the simultaneous formation of two or three figures, there are cutting means provided suitable to cut the film in correspondence with a zone of separation between the two figures, in order to allow the two articles to be removed separately.

In a preferential embodiment, the annular ring-nut is of the interchangeable type, to allow to define perimeter edges, and the relative undercuts, of a different shape according to the specific application.

According to another variant, the molding apparatus comprises auxiliary heating means able to locally determine different temperatures with respect to the rest of the figure.

According to a further variant, the molding apparatus comprises means to deliver compressed air, able to be selectively activated, to collaborate in the operation of forming the film and its adhesion to the inner surface of the female part of the mold.

There are many advantages to the invention, apart from the fact that it obtains a covered article, finished in every part, in a single step.

The complete thermoforming and definitive union of the film and the polyurethane are obtained using heat and pressure generated by the polymerization reaction of the polyurethane itself. This ensures that the quality is constant, that the whole visible surface of the article is perfect and that the results can be repeated; this cannot be obtained with known techniques.

The method eliminates all those steps subsequent to molding, such as filling, sanding and painting, thus bringing considerable advantages in terms of economy, safety (for example, the emission of solvents, waste disposal, fire risks, etc.) and ecology. Moreover, by eliminating these steps it is possible to automate a large part of the operations of the whole production process.

Using a removable and interchangeable ring-nut allows to achieve the desired perimeter undercuts in the article, and therefore allows, substantially in a single step, to produce articles with a complex and elaborate shape.

Moreover, thanks to the removable ring-nut, it is possible to automate the steps to load the film into the mold and to discharge the finished polyurethane article.

In order to obtain higher productivity, a further embodiment provides several molds in line, operating in sequence and having the same characteristics as those described above.

BRIEF DESCRIPTION OF THE DRAWINGS

These characteristics and advantages of the invention will become clear from the following description of the preferential form of embodiment, given as a non-restrictive example, with reference to the attached drawings wherein:

FIGS. 2a–2h show in sequence the cycle of loading, thermoforming, molding and discharge of the polyurethane article using the device according to the invention;

DETAILED DESCRIPTION OF PREFERRED EMBODIMENTS

Figure 1:
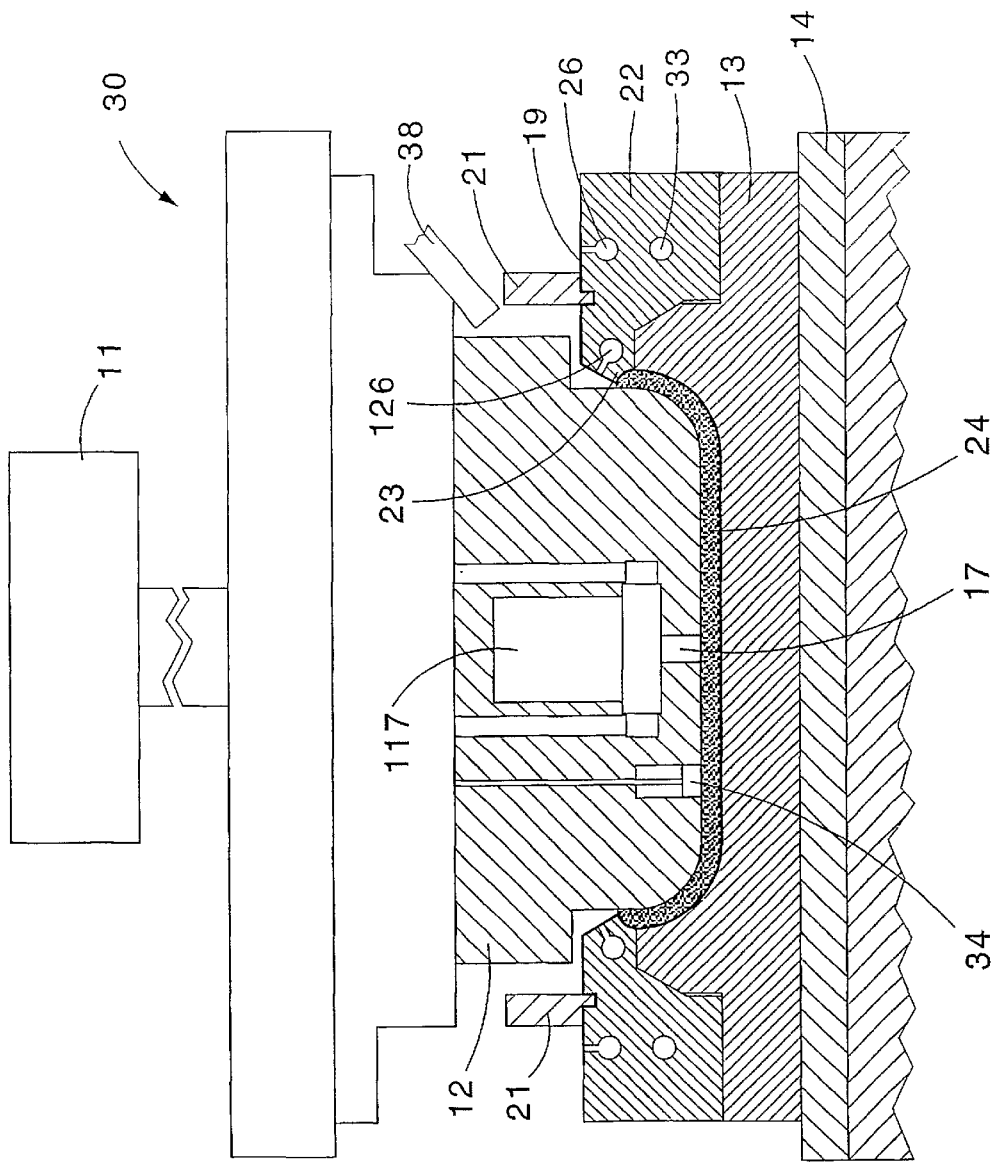
FIG. 1 shows a section of a form of embodiment of the molding apparatus to produce covered polyurethane articles according to the invention.

With reference to the attached Figures, the reference number 10 denotes in its entirety a molding device to produce polyurethane articles according to the invention.

The device 10 comprises a molding apparatus 30 consisting of a female part 13, or matrix, associated with a fixed support 14, and a male part 12, or punch, associated with a press element 11 driven to open/close by means of movement actuators which are not shown here.

Both the male part 12 and the female part 13 have heating means, of a conventional type and not shown here (for example internal conduits with heated water circulating).

The male part 12, in this case in a substantially central position, has an injection channel 17, associated with an injection head 117, through which the foamy polyurethane 24 is injected, when the mold is closed, into the molding cavity 18 defined between the male part 12 and the female part 13.

It is obvious that, within the field of the invention, the injection channel 17 could be located in a non-central position, or there could be two or more injection channels, possibly usable in alternation.

In this case, the molding device 10 comprises means 20 able to feed a thermoformable covering film 19 which is first inserted into the mold 30 and then made to adhere through thermoforming, as will be explained better hereafter, to the inner wall of the female part 13.

The film 19 is between 0.2 and 1.4 mm thick, preferably between 0.4 and 0.8 mm.

In the embodiment shown here, and as can be seen in greater detail in FIG. 1, in cooperation with the perimeter of the female part 13 of the mold there is an annular ring-nut 22 of the removable type with a front perimeter edge 23 facing towards the molding cavity 18. The front edge 23 is suitable to perform a function of continuity, substantially in correspondence with the zone of separation which is formed, when the mold is closed, between the female part 13 and the male part 12 of the mold.

The front edge 23 preferentially has at least part of its perimeter shaped and rounded so as to connect the parts of the mold and so as to allow to form an edge of the article, with its relative perimeter undercut, in correspondence with said position of discontinuity.

In this way, the article can be discharged from the mold already substantially finished, and requires only the perimeter trimming of the possible excess film 19.

In the preferential embodiment, the annular ring-nut 22 has heating means 33, for example hot water circulating inside.

The heating means 33 are advantageously independent and autonomous with respect to the heating means associated with the matrix 13 and the punch 12, so as to be able to determine a differentiated heating in the various zones of the film 19 and/or of the injected polyurethane.

The annular ring-nut 22 according to the invention is able to be moved so that first the film 19 is inserted into the mold 30 and then the finished polyurethane article is discharged from the said mold 30.

The cycle to move the ring-nut 22 to perform the molding of a polyurethane article is shown in FIGS. 2a–2h.

Figure 2A:
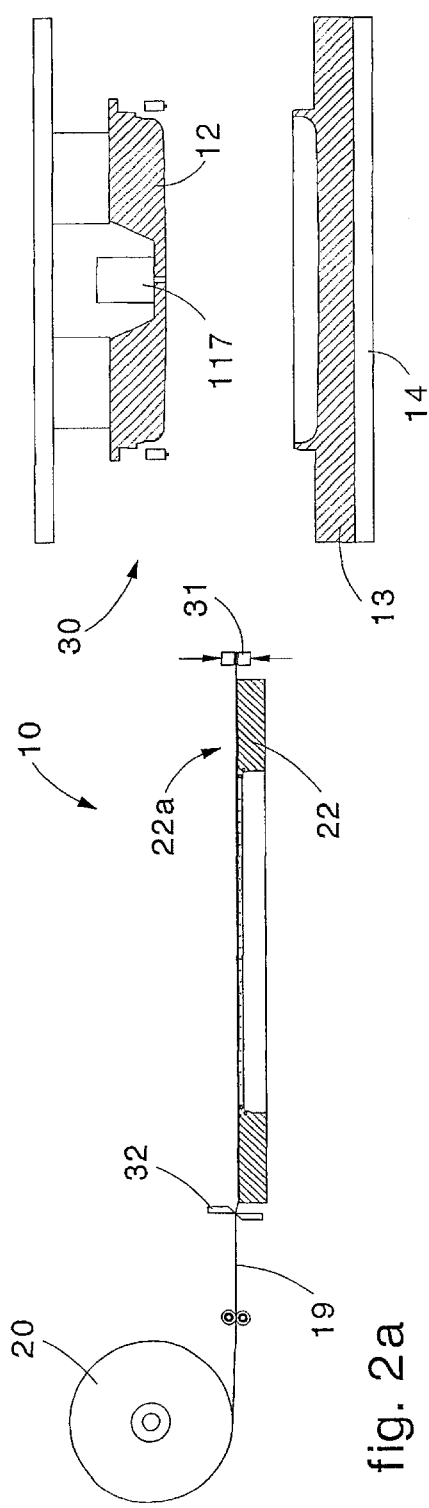
Figure 2B:
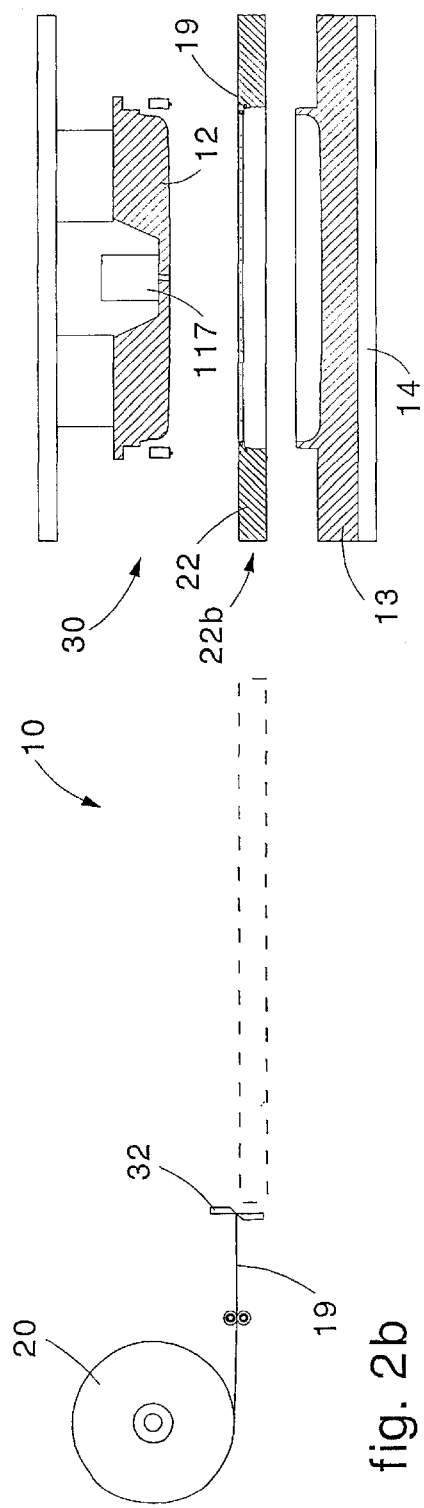

In FIG. 2a, the ring-nut 22 is in a position 22a outside the mold 30 and near the means 20 to feed the film 19.

Gripper means 31, able to translate on a substantially horizontal plane, are arranged to grip the end of the film 19, unroll a segment of a defined length and lay said segment above the ring-nut 22. When the film 19 has been arranged above the ring-nut 22, cutting means 32 are activated to cut the segment from the reel 20.

In this step, first vacuum means 26 are activated, arranged inside and on the perimeter of the ring-nut 22, which are able to be selectively activated to retain the film in co-operation, in this case, with the two short sides of the ring-nut 22.

Figure 2C:
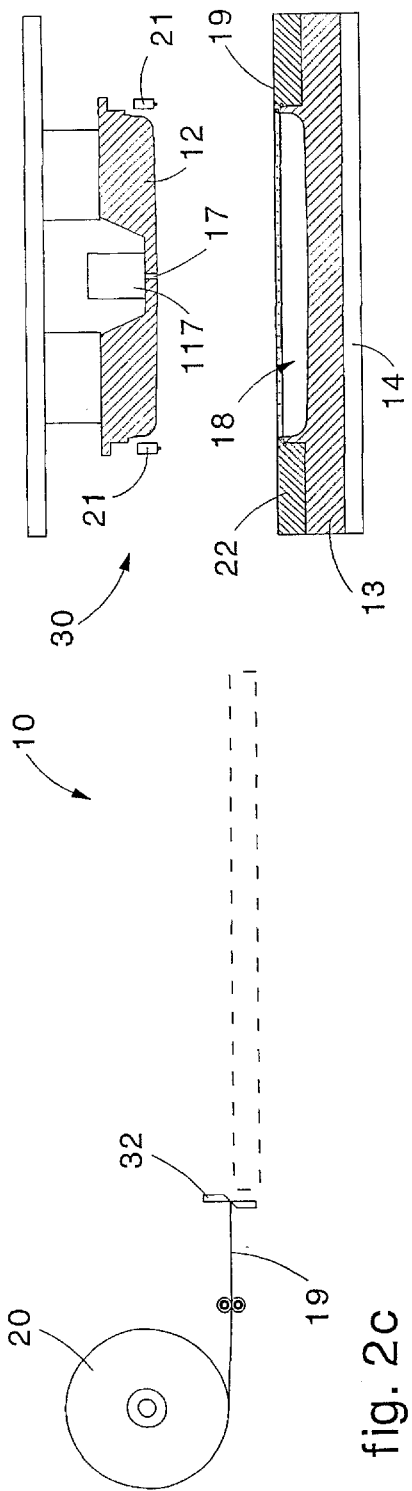

The ring-nut 22 is then translated on a substantially horizontal plane (FIG. 2b) to be taken to a position 22b substantially inside the mold 30, in an intermediate position between the matrix 13 and the punch 12. Then, the ring-nut 22 is lowered substantially to rest on and couple with the perimeter of the matrix 13, with the film 19 held taut above the molding cavity 18 (FIG. 2c).

Figure 2D:
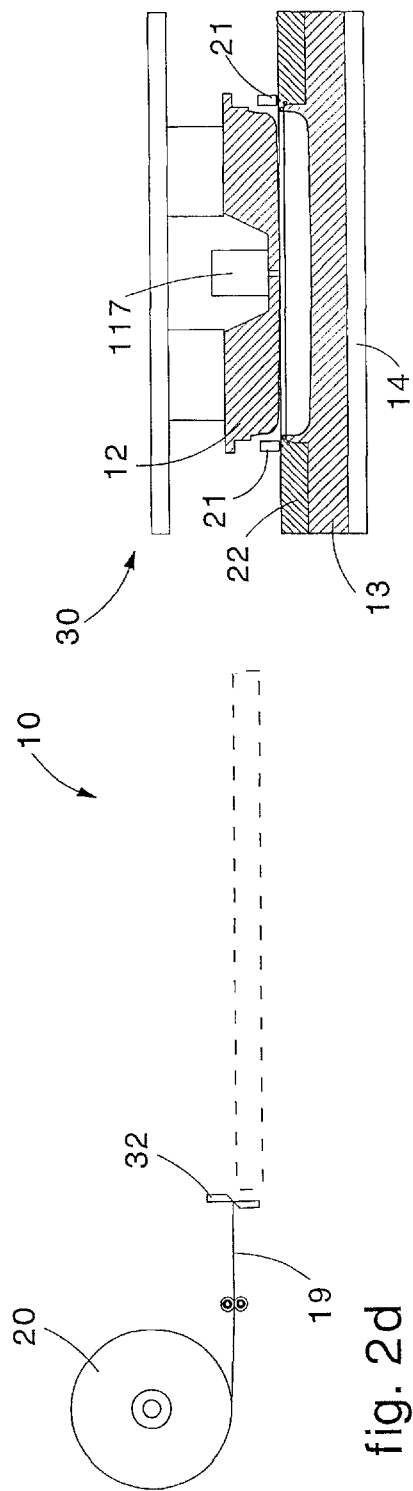
Figure 3:
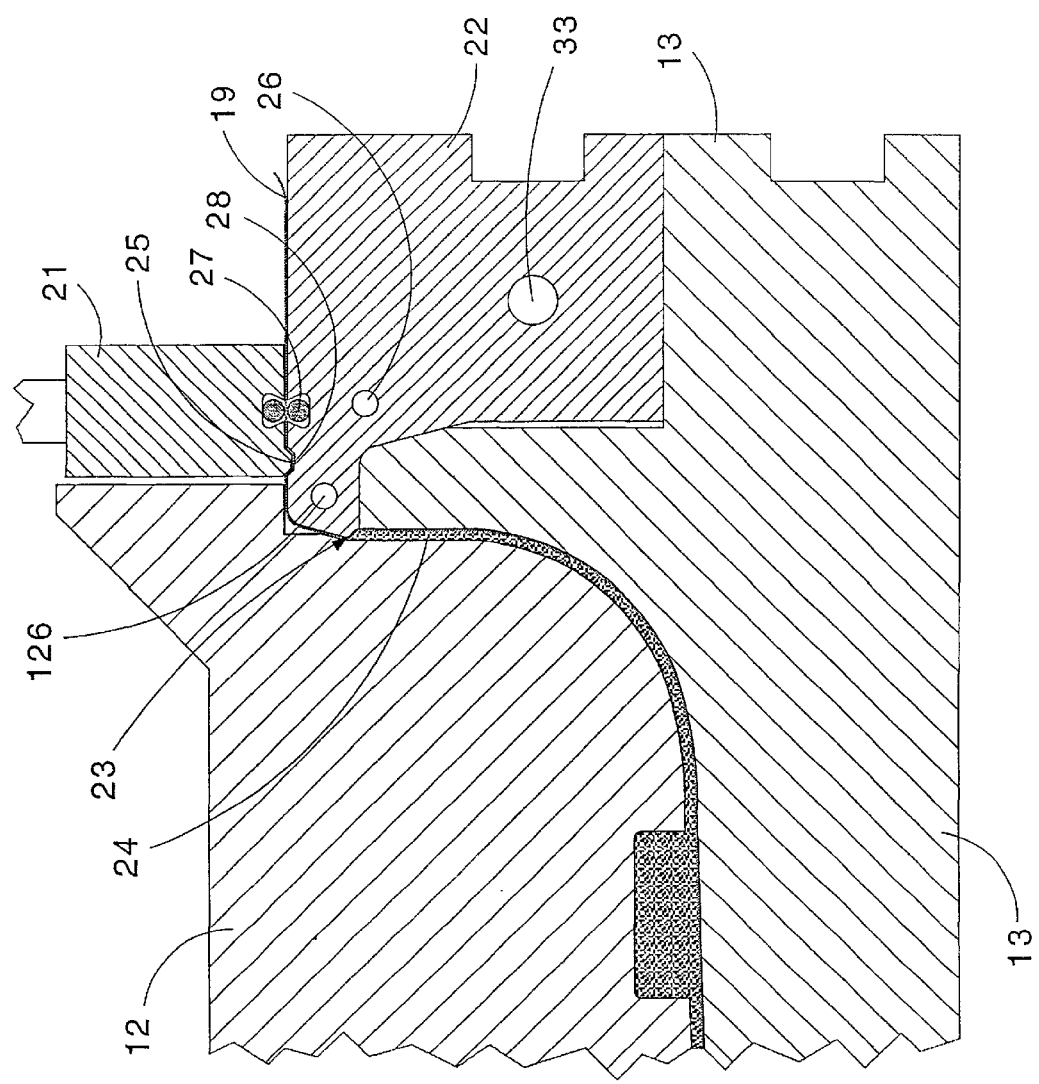
FIG. 3 shows an enlarged detail of the apparatus in FIG. 1.

At this point, the punch 12 is lowered into contact with the film to heat it, and pressure means 21 are activated to mechanically clamp the film 19 in position on the upper edge of the ring-nut 22 (FIG. 2d).

In the embodiment shown here, the action of the pressure means 21 is advantageously adjustable in intensity; in cooperation with relative segments of the upper surface of the annular ring-nut 22, the pressure means 21 define the housing for perimeter vacuum sealing means, such as O-rings 27.

In the case shown here, the pressure means 21 have a tooth 25 suitable to cooperate with a mating cavity 28 made on the perimeter of the annular ring-nut 22, in order to prevent the formation of folds and wrinkles in the film 19 during thermoforming.

The first vacuum means 26 are then de-activated, while the heating means 33 inside the ring-nut 22 are activated and also second vacuum means 126, able to determine the thermoforming of the film 19 and its adhesion to the inner surface of the matrix 13.

During the thermoforming step, according to the variant shown in FIG. 1, means to deliver compressed air 34 associated with the punch 12 are activated to cooperate with said heating means 33 and said second vacuum means 126 in order to complete the thermoforming operation of the film 19.

It should be noted that both the first vacuum means 26 and especially the second vacuum means 126 which are activated during the thermoforming of the film 19 have their relative suction holes arranged outside the figure of the polyurethane article; as a result, when they are activated they do not cause signs, prints or other marks of any type on the visible face of the finished product after molding, which ensures a high surface quality of the visible face.

In this step, it is also possible to activate auxiliary heating means 38 to determine differentiated and localized heating in specific zones of the film 19.

When the thermoforming is complete, the punch 12 is closed on the matrix 13 and the injection of the foam polyurethane 24 is begun through the injection head 117 and the injection channel 17 (FIG. 2*e*).

The heat and pressure generated during polymerization of the polyurethane 24 cause the thermoforming of the film 19 to be completed, and the film 19 is definitively and stably attached to the outer surface of the article.

When molding is complete, the mold is opened (FIG. 2*f*) and the annular ring-nut 22 is first raised and then translated laterally, to allow the article 37 to be removed. The article 37 thus achieved remains resting on the annular ring-nut 22 due to the presence of the perimeter edge of the excess film 19.

Finally, the ring-nut 22 is returned to its initial position 22*a* (FIG. 2*g*) to allow the expulsion means 35 to be activated, which allow to discharge the polyurethane article 37 which falls into an underlying collection tray 36.

From the tray 36, the finished article is sent to a station for the perimeter trimming of the excess film 19, in order to complete the process and to obtain the finished piece.

Figure 4:
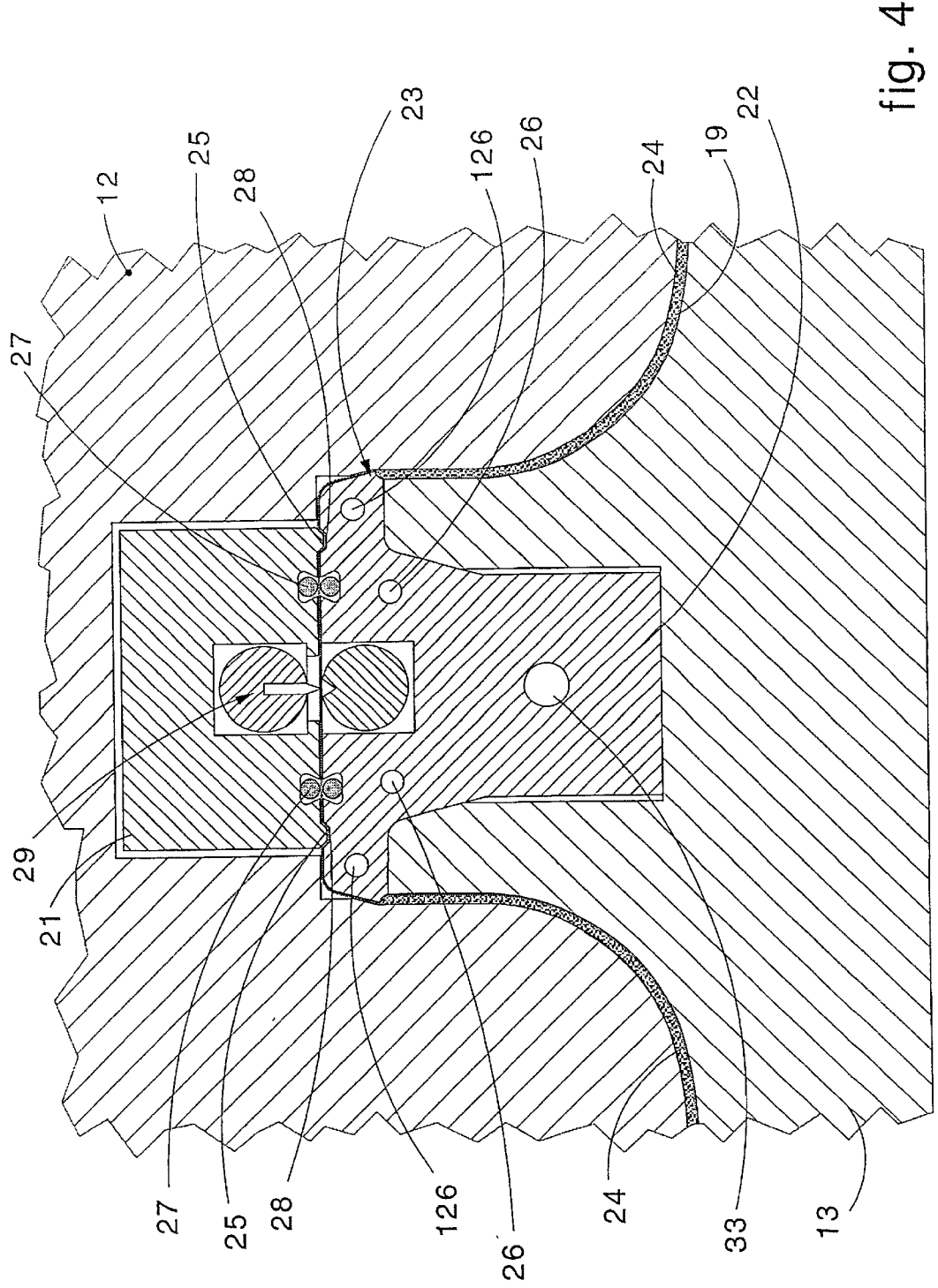
FIG. 4 shows a variant of FIG. 3 in the case of a molding apparatus to make two separate figures.

In the event that the mold is used to simultaneously make two or more adjacent figures (FIG. 4), cutting means 29 are provided to separate the film 19 in correspondence with an intermediate position of said two figures, allowing to remove and discharge individually the two articles thus obtained.

It comes within the field of the invention to provide systems able to apply two films 19, one for each side of the article.

It also comes within the field of the invention to provide that a single press comprises not only two or more figures, but also two or more molds driven simultaneously.

Additions and/or modifications can be made to the method and device as described heretofore without departing from the spirit and scope thereof.

It is also obvious that, although the invention has been described with reference to specific examples, a person skilled in the art shall certainly be able to achieve many other equivalent solutions, all of which shall come within the field and scope of the invention.

What is claimed is:

1. A device to produce at least one polyurethane article covered by a film, including a mold comprising a female part and a male part able to define, when the mold is in a closed position, a molding cavity inside which a polyurethane material is able to be injected, said device also comprising, in association with a perimeter of said female part, means able to perform a connection function in substantial cooperation with a zone of discontinuity between said female part and said male part, wherein said means comprise a movable annular ring-nut including a first position to load a segment of said film in order to insert said segment inside the mold, and a second position, at least partly overlapping on the perimeter of said female part in order to cooperate with said female part during the molding of said polyurethane material.

2. The device of claim 1, wherein said first position is outside the mold.

3. The device of claim 1 or 2, wherein said second position is inside the mold.

4. The device of claim 1, wherein said annular ring-nut has at least a perimeter edge protruding forwards towards said molding cavity and able to allow the formation of a perimeter undercut in correspondence with a perimeter edge of the at least one polyurethane article.

5. The device of claim 1, wherein, at least on a perimeter, said annular ring-nut has first vacuum means able to be selectively activated and able to exert an action of at least temporary retention of said segment of film during the insertion of said segment into said mold.

6. The device of claim 5, wherein, at least on the perimeter, said annular ring-nut has second vacuum means able to be selectively activated and able to locally create a vacuum to cooperate in a thermoforming of said segment of film inside said mold.

7. The device of claim 6, wherein said first and said second vacuum means include relative suction holes arranged in a position outside the figure of the at least one polyurethane article to be made.

8. The device of claim 1, wherein, at least on a perimeter, said annular ring-nut has heating means able to be selectively activated and able to heat said segment of film at least locally during a thermoforming step inside said mold.

9. The device of claim 8, wherein said male part and/or said female part include heating means able to be selectively activated, wherein said heating means of said annular ring-nut are fed in independent and autonomous fashion with respect to said heating means of said male and/or female part.

10. The device of claim 1, wherein it comprises pressure means arranged at least on a perimeter in cooperation with at least part of an upper surface of said annular ring-nut and able to mechanically retain said segment of film at least during a thermoforming step.

11. The device of claim 10, wherein, in cooperation with a relative part of the upper surface of said annular ring-nut, said pressure means define at least a housing seating for perimeter sealing means.

12. The device of claim 11, wherein said perimeter sealing means comprise at least an O-ring housed partly in said annular ring-nut and partly in said pressure means.

13. The device of claims 10, 11, or 12, wherein, in cooperation with a relative part of the upper surface of said annular ring-nut, said pressure means define tensioning means to prevent wrinkles in said film during the thermoforming step.

14. The device of claim 1, wherein it comprises means to deliver compressed air, able to be selectively activated and able to cooperate with said segment of film at least during a thermoforming step.

15. The device of claim 1, wherein it comprises auxiliary heating means able to heat, locally and in a desired fashion, pre-determined zones of said segment of film.

16. The device of claim 1, wherein, at the end of an operation to mold and form the at least one polyurethane article and to open the mold, said annular ring-nut is able to return to a position outside the mold, taking with it said polyurethane article, to allow the extraction and discharge thereof.

17. The device of claim 16, wherein it comprises expulsion means able to cooperate with said annular ring-nut in its position outside the mold to allow said at least one polyurethane article to be discharged and to fall onto collection means.

18. The device of claim 1, wherein it comprises extractor means able to cooperate with said annular ring-nut in a position outside the mold to lay said segment of film in cooperation with at least part of its perimeter.

19. The device of claim 1, wherein it comprises a mold used to form one or more figures simultaneously, cutting means being provided in correspondence with an intermediate position between said two figures to cut said film.

20. The device of claim 1, wherein, at least on a perimeter, said annular ring-nut has second vacuum means able to be selectively activated and able to locally create a vacuum to cooperate in a thermoforming of said segment of film inside said mold.

21. A method to produce, inside a mold, at least one polyurethane article covered with a film, wherein polyurethane is injected inside a molding cavity defined by a coupling of a female part and a male part, at least one of the two parts, male and female, being heated, wherein there are present, in association with the perimeter of said female part, means able to perform a connection function in substantial cooperation with a zone of discontinuity between said female part and said male part, said means allowing to form a perimeter undercut in correspondence with an edge of said article, wherein, in order to insert a segment of said film into the mold, the method provides that said means are taken first to a position outside said mold so that said segment of film can be loaded and clamped onto at least part of a perimeter of said means, then that said means are translated to a position inside the mold and positioned at least partly overlapping the perimeter of said female part.

22. The method of claim 21, wherein, during the displacement of said means from the position outside the mold to the position inside the mold, first vacuum means present at least on the perimeter of said means are activated to maintain said segment of film clamped on an upper surface of said means.

23. The method of claim 21, wherein, after said means have been positioned partly overlapping the perimeter of said female part, the method provides a step of thermoforming of said segment of film in order to make it adhere to the walls of said molding cavity.

24. The method of claim 23, wherein, during the thermoforming step, second vacuum means present at least on the perimeter of said means and arranged outside a figure of the at least one polyurethane article to be made, are activated to attract said segment of film against the walls of said molding cavity.

25. The method of claim 23 or 24, wherein, during the thermoforming step, heating means, present at least on the perimeter of said means, are activated to heat said segment of film.

26. The method of claim 23 or 24, wherein, during the thermoforming step, means to deliver compressed air are activated to cooperate in the adhesion of said segment of film against the walls of said molding cavity.

27. The method of claim 23 or 24, wherein, during the thermoforming step, auxiliary heating means are activated to locally heat specific zones of said segment of film.

28. The method of claim 23 or 24, wherein, after the thermoforming of said segment of film, the method comprises the following steps:
   a polyurethane material is injected by means of an injection head with an injection channel;
   the polyurethane material is polymerized and molded, the thermoforming of said film is consequently completed and said film is stably constrained to the surface of the polyurethane material.

29. The method of claim 28, wherein when molding is complete, the method provides that said means are removed from the mold to proceed with the discharge of said at least one polyurethane article, which remains with the segments of film which are excess to a figure resting on the perimeter of said means.

30. The method of claim 29, wherein it provides that said means are taken to said position outside the mold to cooperate with expulsion means to expel said at least one polyurethane article.

31. A method of claim 21, wherein in said position outside the mold extractor means cooperate with means to feed said film in order to position a segment of said film in co-operation with at least part of the perimeter of said means.

32. At least one polyurethane article having high surface quality and obtained through injection and molding, in a single step, inside a mold comprising at least a male part and a female part, wherein at the end of the molding process the at least one article has a visible surface of a finished article which is lacking of any signs, prints or other marks of any type which could have been produced by vacuum means inside the mold, and the at least one article has a perimeter edge equipped with a perimeter undercut, the formation of which is at least partly defined by rigid auxiliary means able to perform a function of connection in substantial cooperation with a zone of discontinuity between the female part and the male part of the mold.

33. The at least one polyurethane article of claim 32, wherein the at least one article has at least a covering film applied on a visible surface of the at least one article and lacking of any wrinkles and creases which could have been produced in a thermoforming step, this covering film being thermoformed in the mold before the polyurethane is injected and being constrained at least partly onto a body made of expanded polyurethane.

* * * * *